United States Patent
Zhu

(10) Patent No.: US 12,179,827 B2
(45) Date of Patent: *Dec. 31, 2024

(54) STROLLER

(71) Applicant: Wonderland Switzerland AG, Steinhausen (CH)

(72) Inventor: Wanquan Zhu, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,214

(22) Filed: Oct. 16, 2023

(65) Prior Publication Data

US 2024/0034382 A1    Feb. 1, 2024

Related U.S. Application Data

(63) Continuation of application No. 17/839,423, filed on Jun. 13, 2022, now Pat. No. 11,820,415.

(30) Foreign Application Priority Data

Jun. 16, 2021 (CN) .......................... 202110664177.1

(51) Int. Cl.
*B62B 7/08* (2006.01)
*B62B 7/06* (2006.01)

(52) U.S. Cl.
CPC .............. *B62B 7/083* (2013.01); *B62B 7/066* (2013.01); *B62B 2205/22* (2013.01)

(58) Field of Classification Search
CPC .......... B62B 7/083; B62B 7/066; B62B 7/06; B62B 7/08; B62B 7/14; B62B 7/142; B62B 2205/22; B62B 2205/20
See application file for complete search history.

(56) References Cited

U.S. PATENT DOCUMENTS

| | | | |
|---|---|---|---|
| 7,364,183 B2 * | 4/2008 | Lee | B62B 7/142 280/47.38 |
| 9,701,332 B2 * | 7/2017 | Zheng | B62B 7/062 |
| 10,994,764 B2 * | 5/2021 | Yang | B62B 7/062 |
| 2011/0291388 A1 * | 12/2011 | Sellers | B62B 7/08 280/647 |
| 2015/0353115 A1 | 12/2015 | Zheng | |
| 2020/0086906 A1 | 3/2020 | Yang | |

FOREIGN PATENT DOCUMENTS

| | | |
|---|---|---|
| CN | 2385946 Y | 7/2000 |
| CN | 104442979 A | 3/2015 |
| CN | 106170425 A | 11/2016 |
| CN | 110723191 A | 1/2020 |
| CN | 213008318 U | 4/2021 |
| TW | M530264 U | 10/2016 |

OTHER PUBLICATIONS

First Office Action issued in Chinese Patent Application No. 202110664177.1, dated Aug. 17, 2024, 18 pgs.

* cited by examiner

*Primary Examiner* — John D Walters
(74) *Attorney, Agent, or Firm* — HAUPTMAN HAM, LLP

(57) ABSTRACT

A stroller includes a frame, a sliding member and a seat fixing base. The sliding member is rotatably connected to the frame. The seat fixing base is rotatably connected to the frame and slidably connected to the sliding member. When the frame is folded, the frame drives the seat fixing base to slide with respect to the sliding member.

9 Claims, 9 Drawing Sheets

STROLLER

CROSS REFERENCE TO RELATED APPLICATIONS

This application is a continuation application of U.S. application Ser. No. 17/839,423, filed on Jun. 13, 2022. The content of the application is incorporated herein by reference.

BACKGROUND OF THE INVENTION

1. Field of the Invention

The present disclosure relates to a stroller and, more particularly, to a foldable stroller.

2. Description of the Prior Art

A stroller is a tool used by parents to carry babies or children when they go shopping. At present, there are various foldable strollers to facilitate storage or transportation. A seat of a conventional stroller can be folded as a frame of the stroller is folded, such that it is convenient in use. However, the folded seat is located at a higher position to increase an overall height of the frame, such that it is detrimental to store or transport the stroller.

SUMMARY OF THE INVENTION

The present disclosure provides a stroller capable of reducing an overall height of a frame after being folded, so as to solve the aforesaid problems.

The present disclosure provides a stroller. The stroller comprises a frame, a sliding member and a seat fixing base. The sliding member is rotatably connected to the frame. The seat fixing base is rotatably connected to the frame and slidably connected to the sliding member. When the frame is folded, the frame drives the seat fixing base to slide with respect to the sliding member.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
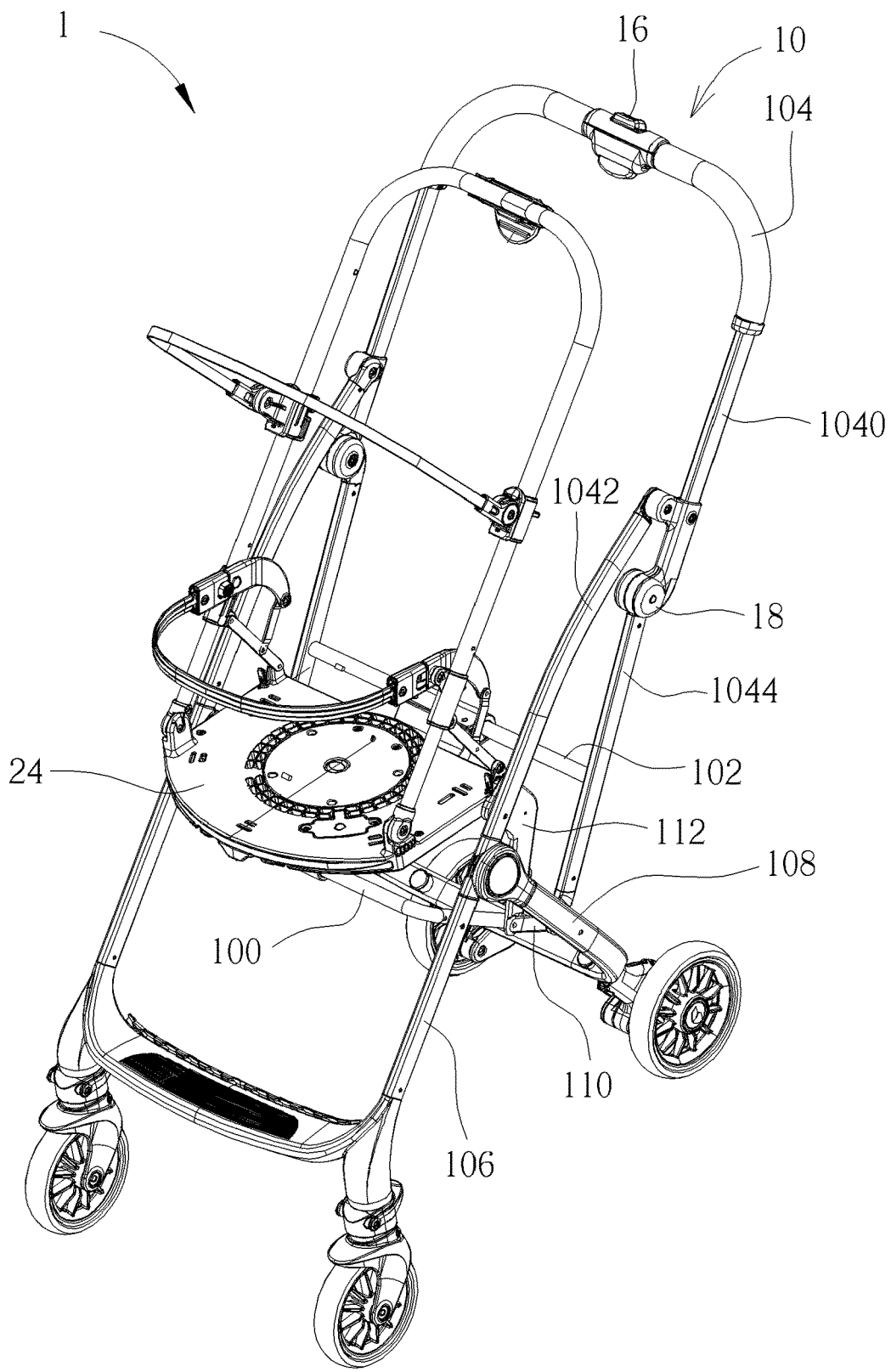
FIG. 1 is a perspective view illustrating a stroller according to an embodiment of the present disclosure.
Figure 2:
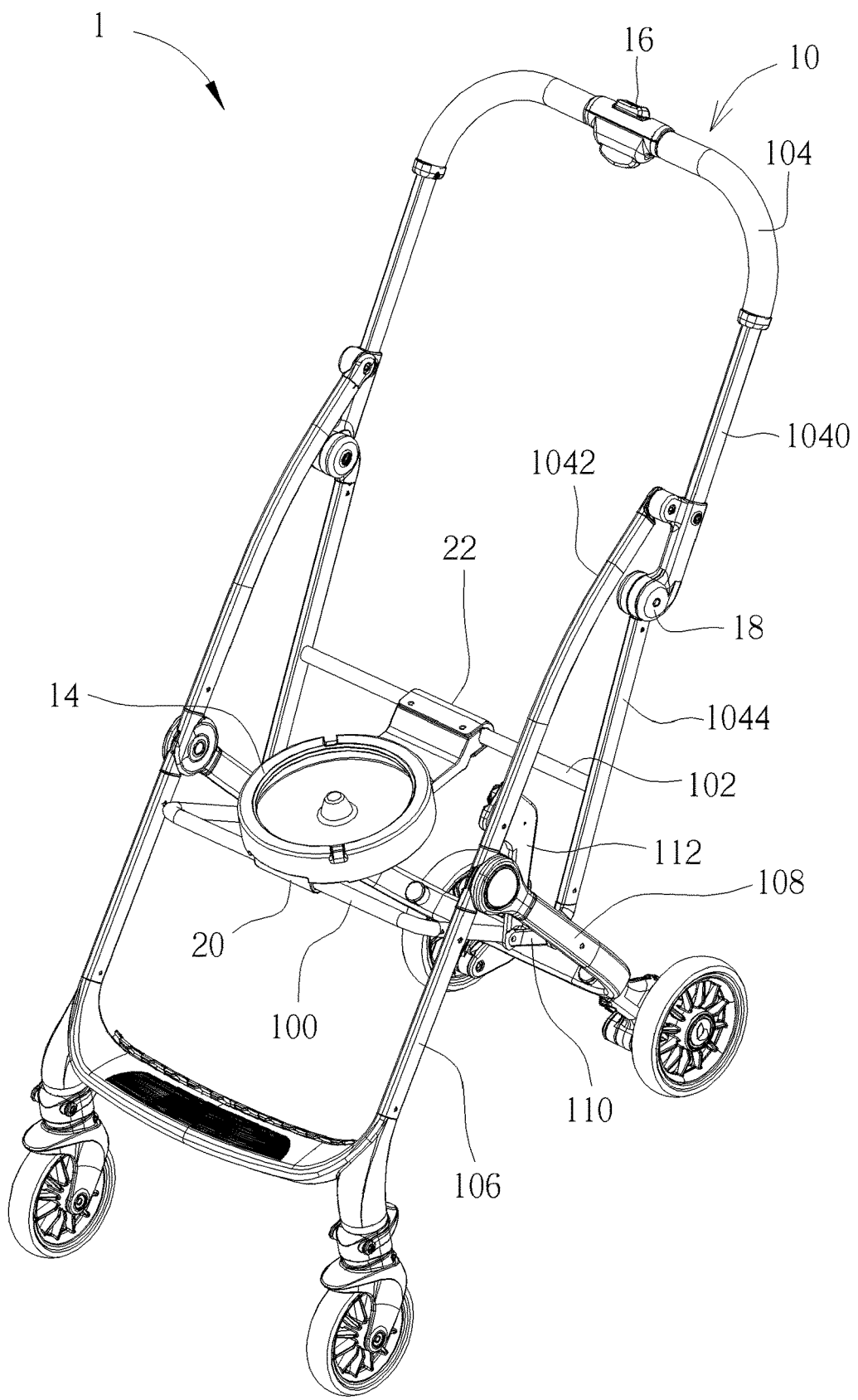
FIG. 2 is a perspective view illustrating the stroller shown in FIG. 1 without a seat.
Figure 3:
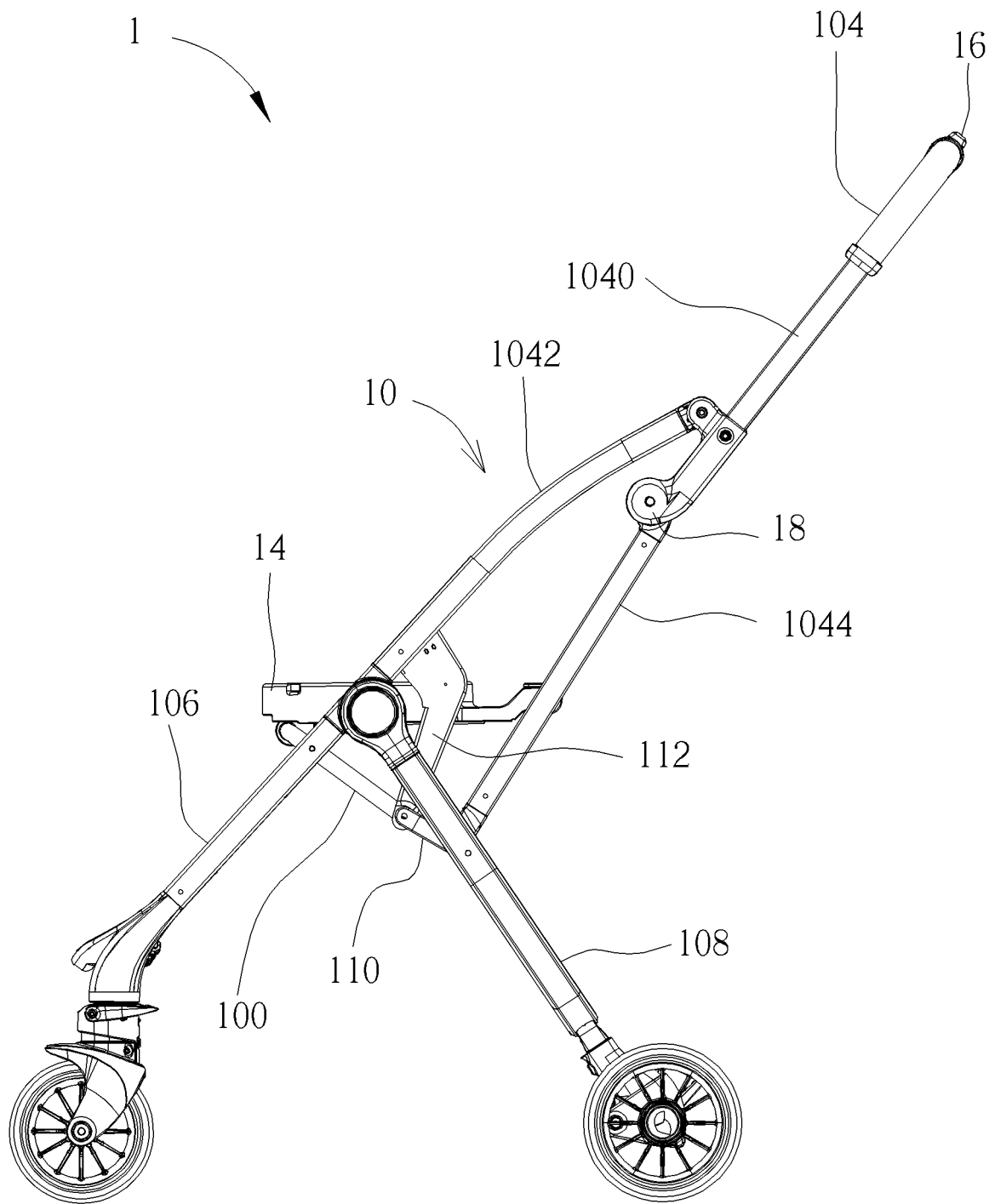
FIG. 3 is a side view illustrating the stroller shown in FIG. 2.
Figure 4:
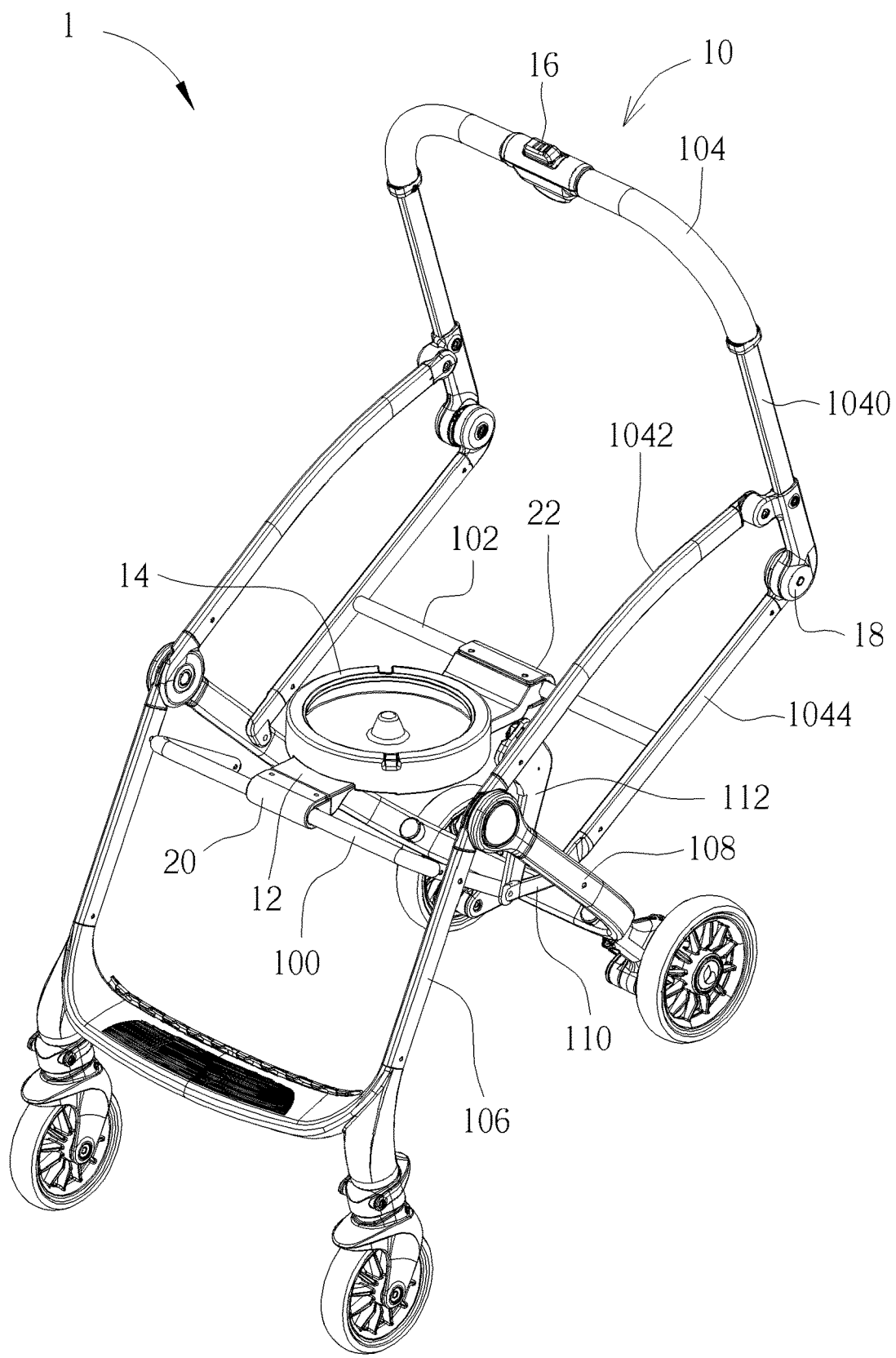
FIG. 4 is a perspective view illustrating the stroller shown in FIG. 2 in a half folding state.
Figure 5:
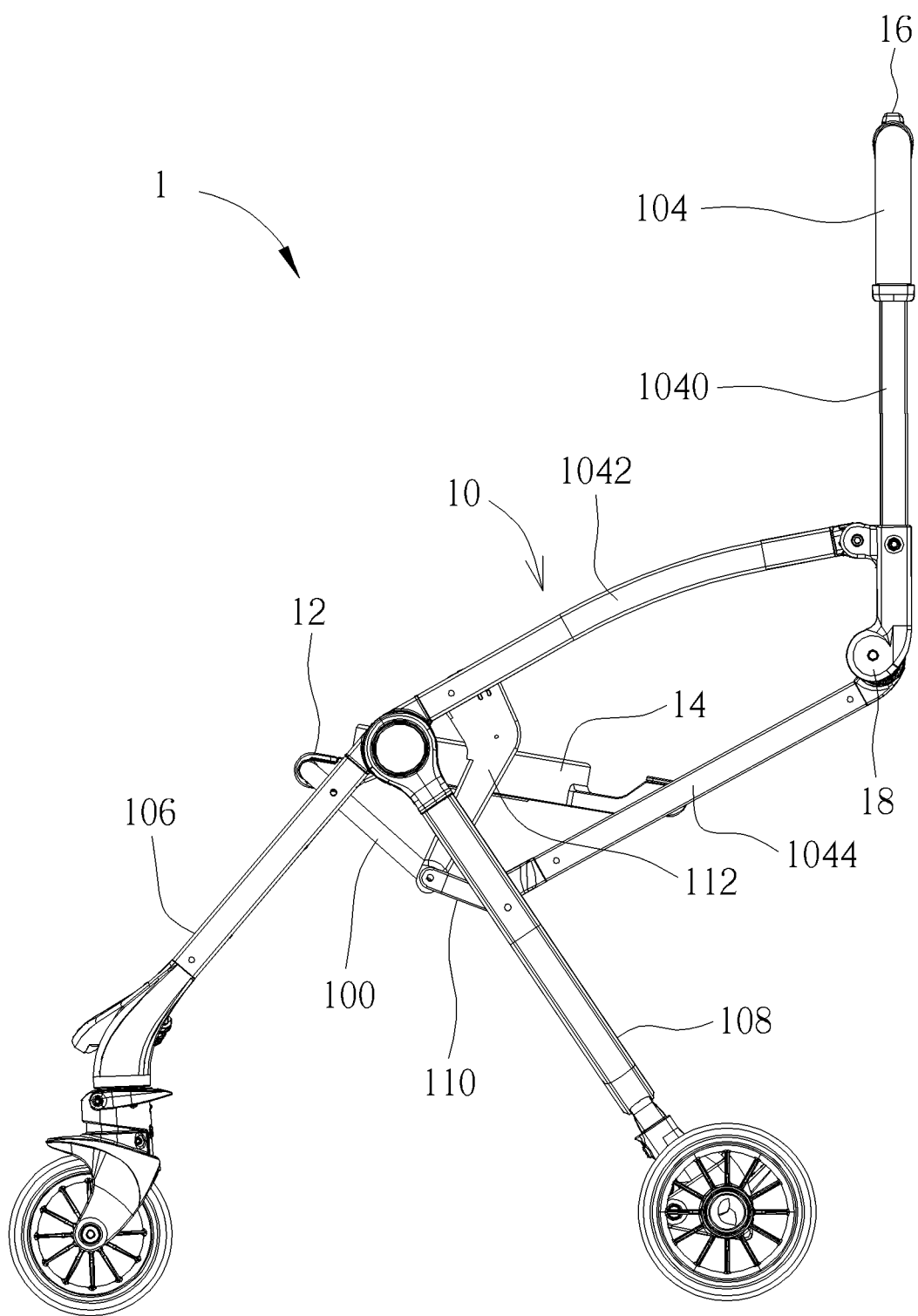
FIG. 5 is a side view illustrating the stroller shown in FIG. 4.
Figure 6:
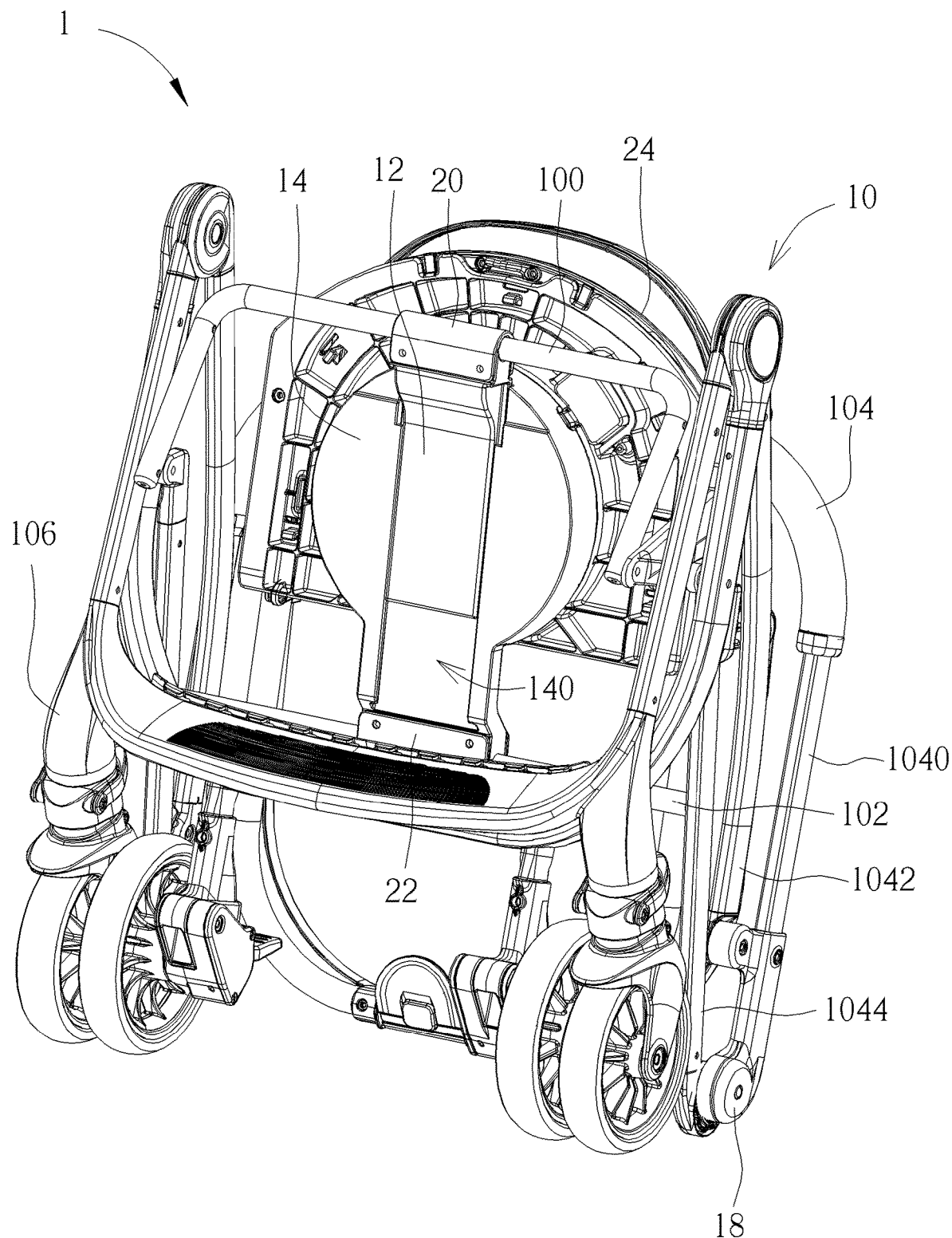
FIG. 6 is a perspective view illustrating the stroller shown in FIG. 2 being folded.
Figure 7:
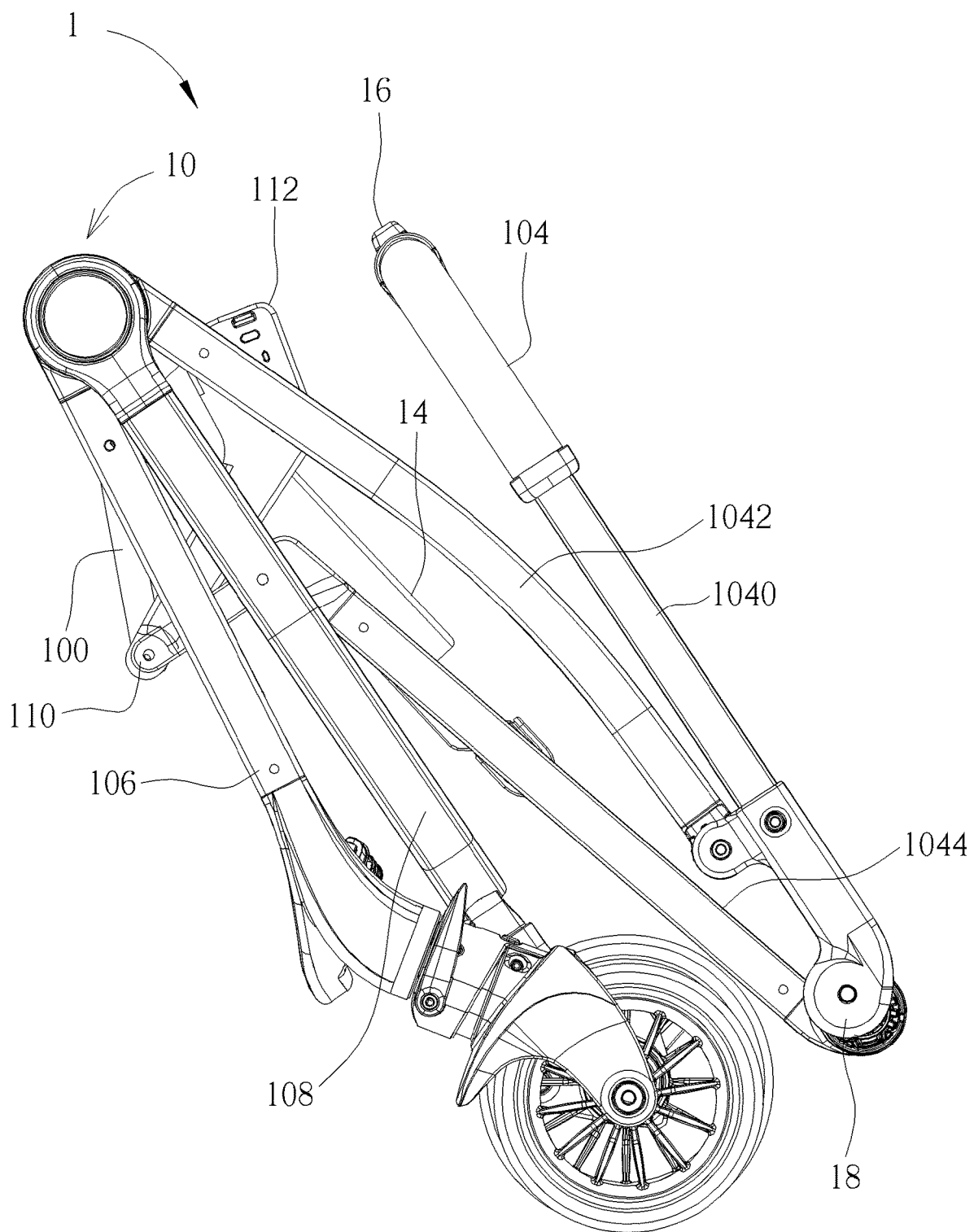
FIG. 7 is a side view illustrating the stroller shown in FIG. 6.
Figure 8:
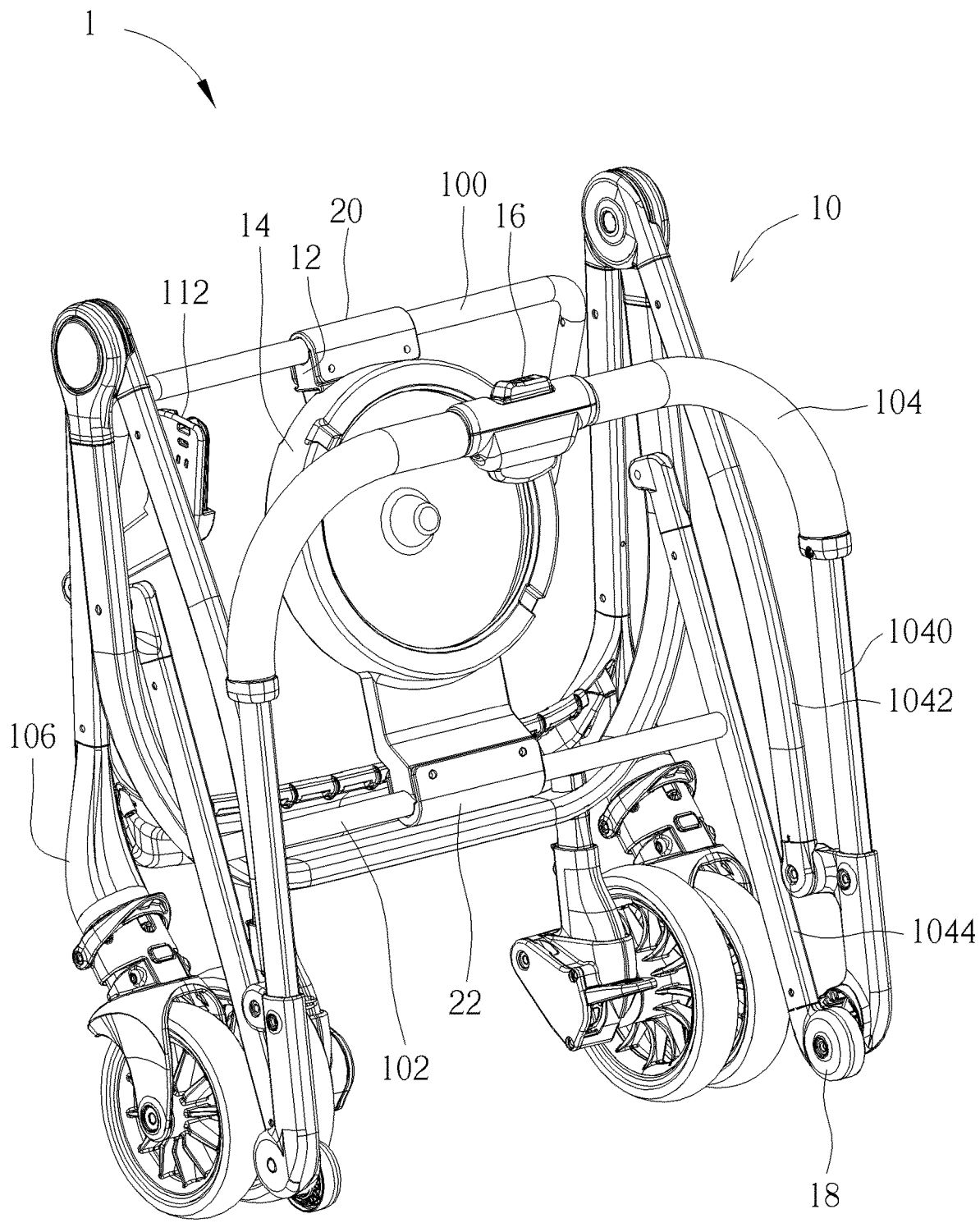
FIG. 8 is a perspective view illustrating the stroller shown in FIG. 6 from another viewing angle.
Figure 9:
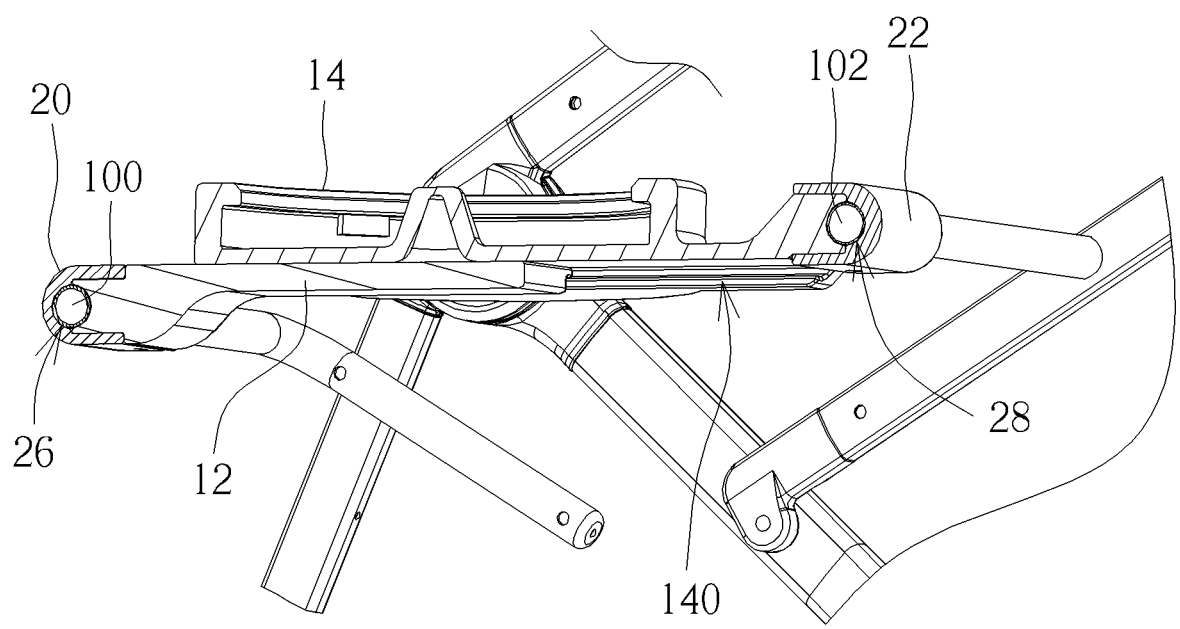
FIG. 9 is a sectional view illustrating a sliding member and a seat fixing base.

Referring to FIGS. 1 to 9, FIG. 1 is a perspective view illustrating a stroller 1 according to an embodiment of the present disclosure, FIG. 2 is a perspective view illustrating the stroller 1 shown in FIG. 1 without a seat 24, FIG. 3 is aside view illustrating the stroller 1 shown in FIG. 2, FIG. 4 is a perspective view illustrating the stroller 1 shown in FIG. 2 in a half folding state, FIG. 5 is a side view illustrating the stroller 1 shown in FIG. 4, FIG. 6 is a perspective view illustrating the stroller 1 shown in FIG. 2 being folded, FIG. 7 is a side view illustrating the stroller 1 shown in FIG. 6, FIG. 8 is a perspective view illustrating the stroller 1 shown in FIG. 6 from another viewing angle, and FIG. 9 is a sectional view illustrating a sliding member 12 and a seat fixing base 14.

As shown in FIGS. 1 to 8, the stroller 1 comprises a frame 10, a sliding member 12, a seat fixing base 14, a folding operation mechanism 16, a lock mechanism 18, a first fixing member 20, a second fixing member 22 and a seat 24. It should be noted that the structure of the stroller 1 of the present disclosure is substantially symmetrical, so some components described in the present disclosure are arranged on both sides of the stroller 1.

As shown in FIGS. 1 to 8, in this embodiment, the frame 10 comprises a front linkage rod 100, a transverse rod 102, a handle 104, a front leg 106, a rear leg 108, a rear linkage rod 110 and a linking member 112. The front linkage rod 100 is pivotally connected to the front leg 106. The transverse rod 102 is disposed on the handle 104. The linking member 112 is pivotally connected to the handle 104. The front linkage rod 100, the linking member 112 and the rear linkage rod 110 are pivotally connected to each other. The handle 104, the rear linkage rod 110 and the rear leg 108 are pivotally connected to each other. Accordingly, the handle 104 is able to drive the front leg 106 and the rear leg 108 to be folded or unfolded through the front linkage rod 100, the rear linkage rod 110 and the linking member 112.

As shown in FIGS. 1 to 8, in this embodiment, the handle 104 may comprise an upper handle 1040, a first lower handle 1042 and a second lower handle 1044. The first lower handle 1042 and the second lower handle 1044 are pivotally connected to the upper handle 1040, such that the upper handle 1040, the first lower handle 1042 and the second lower handle 1044 are able to rotate with respect to each other to be folded or unfolded. The folding operation mechanism 16 is disposed on the upper handle 1040, and the lock mechanism 18 is disposed at a pivotal joint between the upper handle 1040 and the second lower handle 1044. The lock mechanism 18 is configured to lock the upper handle 1040 and the second lower handle 1044. The folding operation mechanism 16 is configured to drive the lock mechanism 18 to unlock the upper handle 1040 and the second lower handle 1044 to fold the stroller 1. In this embodiment, the linking member 112 may be pivotally connected to the first lower handle 1042 and the transverse rod 102 may be disposed on the second lower handle 1044.

The sliding member 12 and the seat fixing base 14 are both rotatably connected to the frame 10. As shown in FIGS. 2, 4 and 9, the transverse rod 102 is disposed with respect to the front linkage rod 100. The sliding member 12 is rotatably connected to the front linkage rod 100. The seat fixing base 14 is rotatably connected to the transverse rod 102 and slidably connected to the sliding member 12. In this embodiment, the sliding member 12 may be rotatably connected to the front linkage rod 100 by the first fixing member 20, and the seat fixing base 14 may be rotatably connected to the transverse rod 102 by the second fixing member 22. As shown in FIG. 9, the first fixing member 20 may be connected to an end of the sliding member 12, such that a first shaft hole 26 is formed between the first fixing member 20 and the sliding member 12. Thus, the front linkage rod 100 may be disposed in the first shaft hole 26, such that the sliding member 12 is rotatably connected to the front linkage rod 100. Furthermore, the second fixing member 22 may be connected to an end of the seat fixing base 14, such that a second shaft hole 28 is formed between the second fixing member 22 and the seat fixing base 14. Thus, the transverse rod 102 may be disposed in the second shaft hole 28, such that the seat fixing base 14 is rotatably connected to the transverse rod 102. In this embodiment, a bottom of the seat fixing base 14 may have a sliding groove 140. The sliding member 12 may be disposed in the sliding groove 140, such that the seat fixing base 14 is slidably connected to the sliding member 12.

As shown in FIGS. 2 to 8, when the frame 10 is folded, the frame 10 drives the seat fixing base 14 to slide with respect to the sliding member 12. In this embodiment, when the frame 10 is folded, the front linkage rod 100 and the transverse rod 102 move away from each other, such that the seat fixing base 14 slides downward with respect to the sliding member 12 (i.e. the seat fixing base 14 slides toward the ground with respect to the sliding member 12). As shown in FIGS. 1 and 2, the seat 24 is detachably disposed on the seat fixing base 14. When the seat 24 is disposed on the seat fixing base 14, the seat fixing base 14 drives the seat 24 to slide downward to reduce the overall height of the frame 10 after being folded, such that it is beneficial to store or transport the stroller 1.

In another embodiment, the sliding member 12 may also be rotatably connected to the transverse rod 102 or rotatably connected to a component between the transverse rod 102 and the front linkage rod 100, and the seat fixing base 14 may also be rotatably connected to the front linkage rod 100. When the frame 10 is folded, the front linkage rod 100 moves downward and the transverse rod 102 moves upward, such that the front linkage rod 100 and the transverse rod 102 move away from each other. At this time, the seat fixing base 14 slides upward with respect to the sliding member 12 to reduce the overall height of the frame 10 after being folded, such that it is beneficial to store or transport the stroller 1.

Therefore, according to different applications, the sliding member 12 may be rotatably connected between the transverse rod 102 and the front linkage rod 100, and the seat fixing base 14 may be rotatably connected to the transverse rod 102 or the front linkage rod 100. When the frame 10 is folded, the front linkage rod 100 and the transverse rod 102 move away from each other, such that the seat fixing base 14 slides with respect to the sliding member 12.

As mentioned in the above, when the frame of the stroller of the present disclosure is folded, the front linkage rod and the transverse rod move away from each other, such that the seat fixing base slides with respect to the sliding member. When the seat is disposed on the seat fixing base, the seat fixing base drives the seat to slide to reduce the overall height of the frame after being folded, such that it is beneficial to store or transport the stroller.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stroller comprising:
   a frame;
   a sliding member rotatably connected to the frame; and
   a seat fixing base rotatably connected to the frame and slidably connected to the sliding member;
   wherein when the frame is folded, the frame drives the seat fixing base to slide with respect to the sliding member, and
   wherein the seat fixing base has a sliding groove and the sliding member is disposed in the sliding groove.

2. The stroller of claim 1, wherein the frame further comprises a front linkage rod, a transverse rod, a handle, a front leg, a rear leg, a rear linkage rod and a linking member, the front linkage rod is pivotally connected to the front leg, the transverse rod is disposed on the handle, the linking member is pivotally connected to the handle, the front linkage rod, the linking member and the rear linkage rod are pivotally connected to each other, the handle, the rear linkage rod and the rear leg are pivotally connected to each other, and the handle drives the front leg and the rear leg to be folded or unfolded through the front linkage rod, the rear linkage rod and the linking member.

3. The stroller of claim 2, wherein the handle comprises an upper handle, a first lower handle and a second lower handle, and the first lower handle and the second lower handle are pivotally connected to the upper handle, such that the upper handle, the first lower handle and the second lower handle are able to rotate with respect to each other to be folded or unfolded.

4. The stroller of claim 3, wherein the linking member is pivotally connected to the first lower handle and the transverse rod is disposed on the second lower handle.

5. The stroller of claim 3, further comprising a folding operation mechanism and a lock mechanism, the folding operation mechanism is disposed on the upper handle, the lock mechanism is disposed at a pivotal joint between the upper handle and the second lower handle, the lock mechanism is configured to lock the upper handle and the second lower handle, and the folding operation mechanism is configured to drive the lock mechanism to unlock the upper handle and the second lower handle.

6. The stroller of claim 1, further comprising a first fixing member and a second fixing member, the frame further comprising a front linkage rod and a transverse rod, the sliding member being rotatably connected to the front linkage rod by the first fixing member, the seat fixing base being rotatably connected to the transverse rod by the second fixing member.

7. The stroller of claim 6, wherein the first fixing member is connected to an end of the sliding member, a first shaft hole is formed between the first fixing member and the sliding member, the front linkage rod is disposed in the first shaft hole, the second fixing member is connected to an end of the seat fixing base, a second shaft hole is formed between the second fixing member and the seat fixing base, and the transverse rod is disposed in the second shaft hole.

8. The stroller of claim 1, wherein the sliding groove is arranged on a bottom of the seat fixing base.

9. The stroller of claim 1, further comprising a seat, the seat being detachably disposed on the seat fixing base.

* * * * *